June 4, 1968     F. J. KAISLER ET AL     3,386,786

MIRROR RESONANT SPRING NUTATING DEVICE

Filed Dec. 13, 1965     4 Sheets-Sheet 1

INVENTORS
FRANCIS J. KAISLER
GORDON E. LYNN
BY *Harry A. Herbert Jr.*
ATTORNEY

*Richard J. Killore*
AGENT

June 4, 1968   F. J. KAISLER ET AL   3,386,786

MIRROR RESONANT SPRING NUTATING DEVICE

Filed Dec. 13, 1965                       4 Sheets-Sheet 2

INVENTORS
FRANCIS J. KAISLER
GORDON E. LYNN
BY *Harry A. Herbert Jr.*
ATTORNEY

*Richard J. Killoren*
AGENT

United States Patent Office 3,386,786
Patented June 4, 1968

3,386,786
MIRROR RESONANT SPRING NUTATING
DEVICE
Francis J. Kaisler, Ellicott City, and Gordon E. Lynn, Severna Park, Md., assignors, by mesne assignments, to the United States of America as represented by the Secretary of the Air Force
Filed Dec. 13, 1965, Ser. No. 513,914
5 Claims. (Cl. 350—6)

This invention relates to a device for providing nutating motion for a mirror such as used in an infrared search and tracking system.

One object of the invention is to provide a device which will impart a nutating motion to a mirror in which friction and power dissipation are minimized.

This and other objects will be more fully understood from the following detailed description taken with the drawing, wherein.

Figure 1:
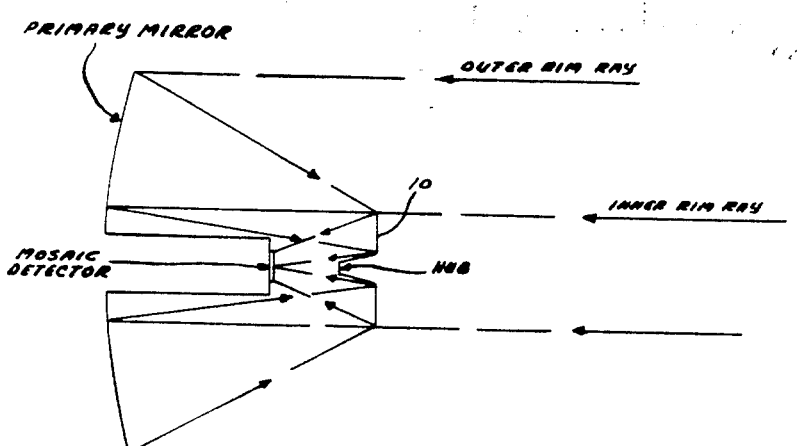
FIG. 1 shows one form of optical system in which the device of the invention can be used.

Various types of apparatus have been used to provide nutating images in infrared search and tracking systems. In applications for space or in applications which use very high nutation frequencies, the power consumption in motor-driven systems is undesirably large. This invention provides a system with low power requirements in which a resonant spring system is used for power conservation in moving a mirror such as 10 in the optical system of FIG. 1.

Figure 3:
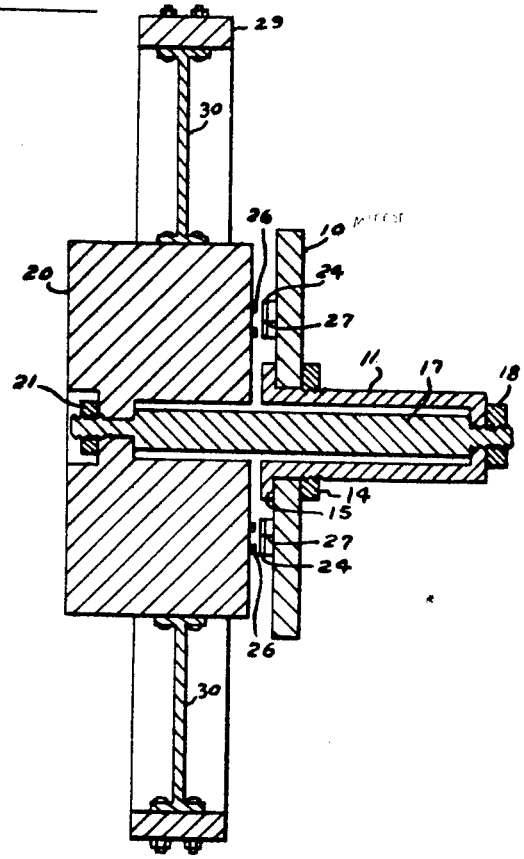
FIG. 3 is a sectional view of the device of FIG. 2 along the line 3—3.
Figure 4:
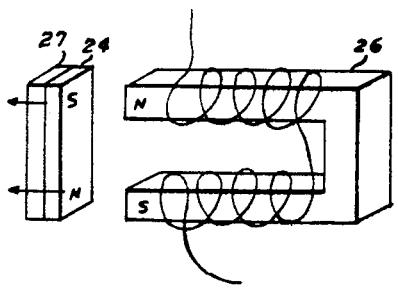
FIG. 4 is an enlarged partially schematic view of the electromagnets for the device of FIG. 2.
Figure 2:
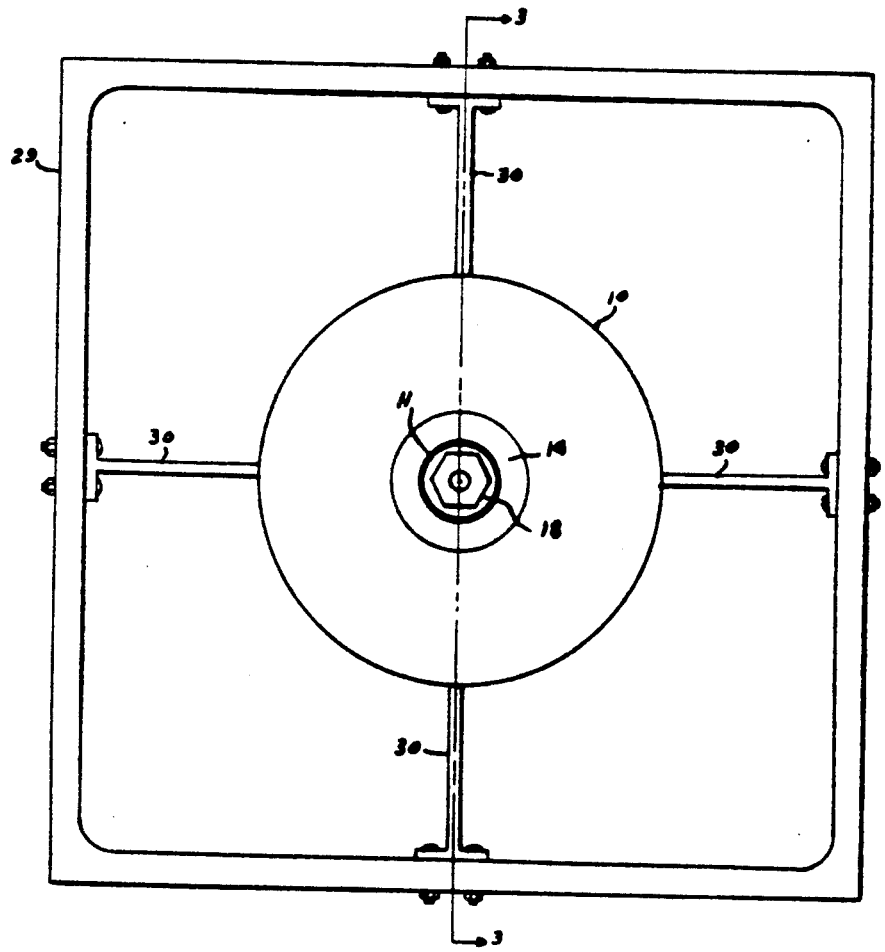
FIG. 2 is a front elevational view of a mirror nutating device according to one embodiment of the invention.

As shown in FIGS. 2 and 3, the mirror 10 is secured to a hub 11 by means of a retainer 14 and flange 15. The hub is secured to a flexible beam 17 by means of a retainer 18. The beam may be made of a material such as titanium and is designed to be resonant at the operating frequency. The flexible beam 17 is secured to a ballast weight 20, of substantial mass by means of a retainer 21. In one device built, the weight of the ballast was made ten times the weight of the mirror. The beam 17 has a circular cross-section to provide symmetrical bending in all directions. A driving force is imparted to four permanent magnets 24, two of which are shown, that are secured to the back of the mirror 10 and spaced 90° apart. The driving torque is provided by means of electromagnets 26, mounted on the ballast weight 20. The permanent magnets are bonded, by any well-known bonding means, to steel plates 27 which act as keepers for the permanent magnets. The steel plates are bonded to the back of the mirror 10. The complete assembly is supported within a frame 29 by means of a spider consisting of four wire rods 30.

The spider support, on the device built, was designed to be resonant at about 50 c.p.s. The device built and tested had the following parameters.

Mirror deflection _____ ±21 min. of arc.
Frequency _____ 830 c.p.s.
Power input _____ 1.3 watts/axis.
Mechanical power consumption ____ .14 watt/axis.
Frequency bandwidth between half
  amplitude points _____ 1.2 c.p.s.

Figure 5:
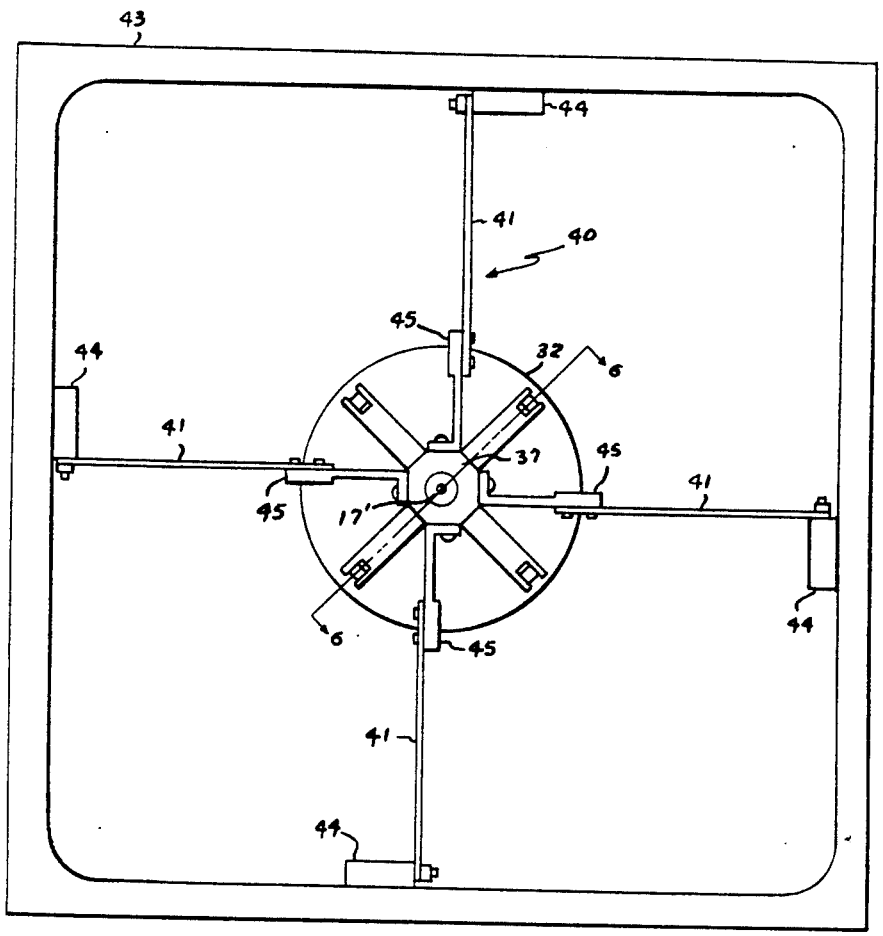
FIG. 5 is a front elevational view of a modified mirror nutating device according to another embodiment of the invention.
Figure 6:
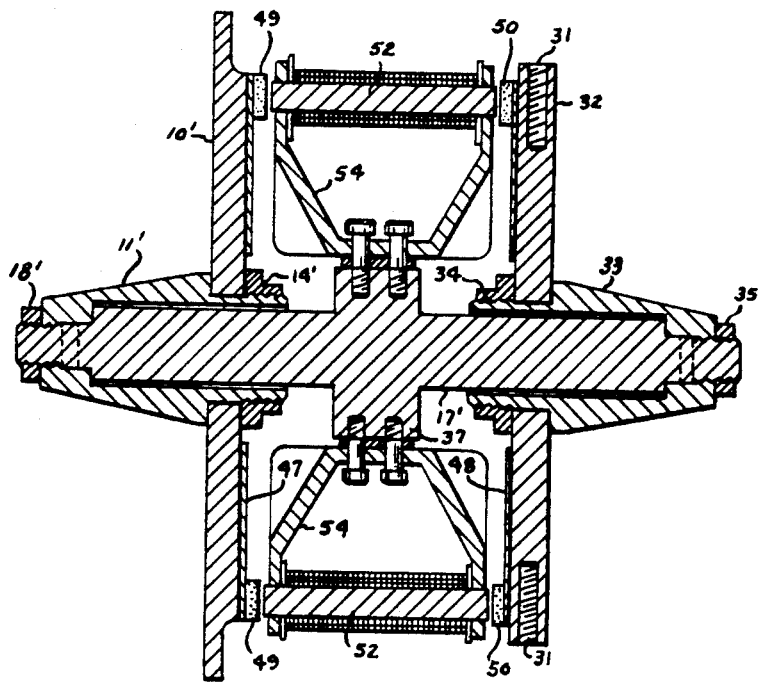
FIG. 6 is an enlarged sectional view of the device of FIG. 5 along the line 6—6, with the mirror in place.

A device that has less weight and better vibration isolation than the device just described is shown in FIGS. 5 and 6. In this device, the ballast weight is replaced with a counterbalance mass 32 secured to hub 33 by means of a retainer 34. The hub 33 is secured to the resonant beam 17' by means of a retainer 35. Tuning screws 31 are provided on the counterbalance 32. The mirror 10' and hub 11' are secured to beam 17' in substantially the same manner as the counterbalance mass 32. A center support 37 is provided on beam 17'. The counterbalance mass 32 and the mirror 10' are designed to have the same moment of inertia about the effective pivot point in the beam 17' so that the net torque at the center support will be zero. For small deflections, the effective pivot center is at the midspans of each flexible end of beam 17'. The center of gravity of the moving components is positioned at the effective pivot center so that these components experience only angular displacement without translation. Consequently, the unit can be suspended from the center support without being a primary vibration excitation force. Residual vibrations at the center support, due to inaccuracies can be filtered out by means of a low frequency spider support 40. The spider support consists of four leaf springs 41 secured to frame 43 by means of brackets 44 and to the center support 37 by means of brackets 45.

In this device, annular magnetic shunts 47 and 48 are provided on the mirror 10' and counterbalance 32, respectively. Permanent magnets 49 are bonded to shunt 47 and permanent magnets 50 are bonded to shunt 48. The drive is provided by bar coils 52 held by supports 54, secured to center support 37, which are made of a nonmagnetic material such as bronze or nonmagnetic stainless steel. Since both the push and pull parts of the device are in the same magnetic circuit, in this device, the total air gap is constant, and the drive pulse will be more uniform in time.

Figure 7:
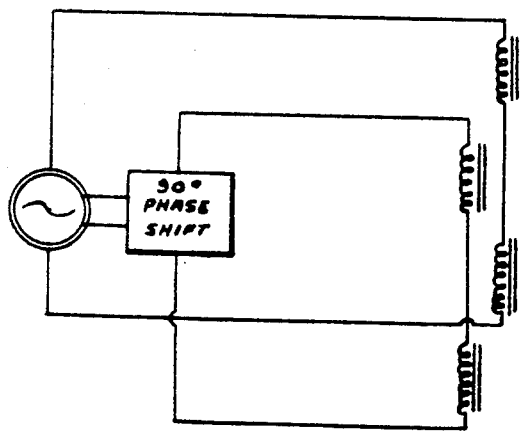
FIG. 7 is a circuit schematic for the energizing circuit for the driving apparatus for the devices of FIGS. 2 and 5.

The drive circuit for the devices of FIGS. 2 and 5 is shown schematically in FIG. 7.

While a two-axis drive system has been shown and described, it is obvious that the device could be used as well in a one-axis system.

These is thus provided a device for providing nutating motion for a mirror.

While certain specific embodiments have been described, it is obvious that numerous changes may be made without departing from the general principles and scope of the invention.

We claim:

1. A device for providing nutating motion for image in an infrared search and tracking system, comprising an annular shaped mirror having a predetermined mass; a plurality of equiangularly spaced permanent magnets on the back surface of said mirror; electromagnetic means adjacent said permanent magnets for imparting nutating motion to said mirror at a predetermined frequency; a flexible beam resonant at said predetermined frequency; means for supporting said mirror at one end of said flexible beam; reaction means supported on the other end of said flexible beam for providing a reaction force for said mirror at least to the vibration forces of said mirror;

a support frame; resilient means, for supporting said flexible beam on said frame and means for supporting said electromagnetic means on said flexible beam.

2. The device as described in claim 1 wherein said means for providing a reaction force for said mirror is a ballast having a weight approximately ten times the weight of the mirror.

3. The device as described in claim 2 wherein said electromagnets are supported by said ballast weight.

4. The device as described in claim 1 wherein said electromagnetic means are straight bar magnets, having one end adjacent the permanent magnets on said mirror and wherein said means for providing a reaction force for said mirror in an annular counterbalance member having a mass equivalent to the mass of said mirror and having a plurality of permanent magnets equiangularly spaced thereon adjacent the other end of said bar magnets.

5. The device as described in claim 4 wherein a center support is provided on said beam with said electromagnet support means and said resilient means being rigidly attached to said center support.

References Cited
UNITED STATES PATENTS

| | | | |
|---|---|---|---|
| 3,020,414 | 2/1962 | McKnight et al. | 350—6 X |
| 3,071,036 | 1/1963 | McKnight et al. | 350—6 |
| 3,107,300 | 10/1963 | Stanley et al. | 350—6 X |
| 3,156,759 | 11/1964 | Collen | 350—6 |
| 3,234,393 | 2/1966 | Ruschmann | 250—235 |
| 2,993,403 | 7/1961 | Harries | 350—6 |
| 3,309,665 | 3/1967 | Kohl | 350—6 X |

DAVID H. RUBIN, *Primary Examiner.*

P. R. GILLIAM, *Assistant Examiner.*